June 7, 1955     H. L. HEINEKE     2,709,884
LAWN MOWER REEL
Original Filed July 1, 1950
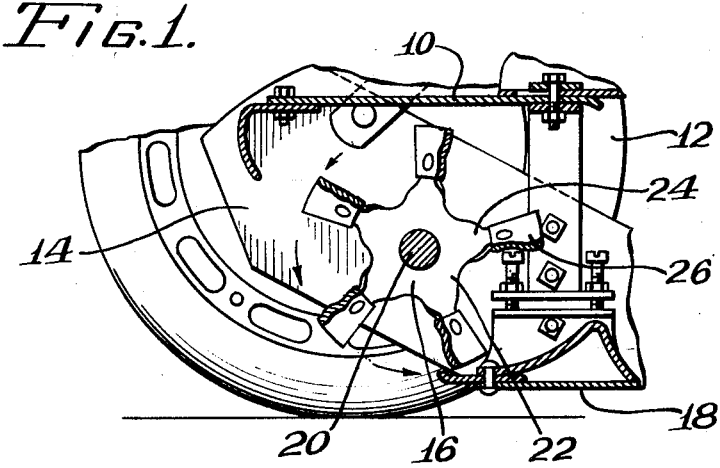
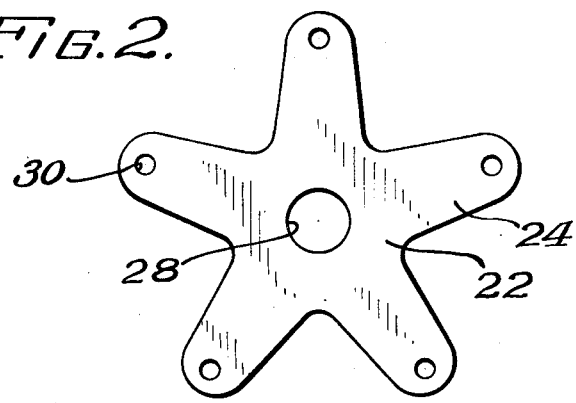
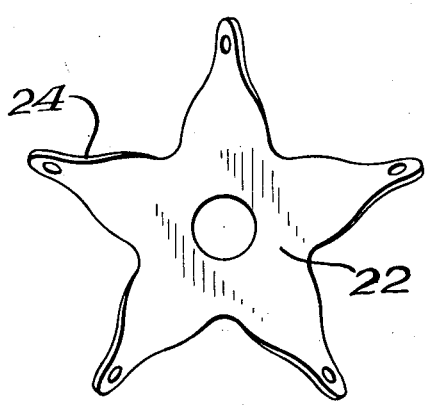
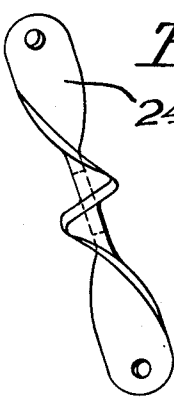
Inventor:
Henry L. Heineke
By Warren D. Horton
Attorney

United States Patent Office 2,709,884
Patented June 7, 1955

2,709,884

LAWN MOWER REEL

Henry L. Heineke, Springfield, Ill.

Original application July 1, 1950, Serial No. 171,613. Divided and this application January 26, 1953, Serial No. 333,152

2 Claims. (Cl. 56—294)

My invention relates to reel-type lawn mowers and more particularly to an improved spider which makes possible a substantially stronger and at the same time less expensive reel than those heretofore known. The subject matter of this application was originally presented in my copending application Serial No. 171,613, filed July 1, 1950, of which this is a division.

The primary object of my invention therefore is the provision of a spider of novel design which is substantially less expensive than prior spiders to fabricate, which is simpler in design and yet which results in an appreciably stronger reel in that forces which normally tend to loosen the attachment of the cutting blades to the spiders are avoided.

Other objects and advantages of my invention will be apparent from the following description and drawing in which:

Fig. 1 is a fragmentary section of a lawn mower incorporating my improved spider, the section being taken on a plane perpendicular to the shaft of the reel;

Fig. 2 is an enlarged elevation of the blank from which the spider of my invention is formed;

Fig. 3 is a view similar to Fig. 2 showing, however, the completed spider; and

Fig. 4 is an edge elevation which may be considered as being taken looking at the right side of Fig. 3.

In Fig. 1 is shown a portion of a lawn mower having a carriage 10 and wheels 12 rotatably secured to the carriage. A drive mechanism is enclosed in the housing 14 and through suitable gearing serves to transmit force from the wheels of the mower to the reel 16 to turn it. A bed knife structure 18, fixed relative to the carriage 10 provides, of course, the edge in cooperation with which the reel accomplishes the shearing of the grass blades. The reel is composed of a central rotating rod or tube 20 which is journalled at its ends in the housing 14 for rotation, and is appropriately geared on a stub end inside the housing to be driven through the above-mentioned gear chain by the wheels. The rod 20 has secured thereto a plurality of spiders 22 which in the illustrated embodiment have five arms 24, each attached to helical blades 26. To this point the structure described is or may be entirely conventional.

My experience with spiders normally employed in lawn mower reels has been that the point of attachment of the blade to the spider has been spaced from the plane of the body of the spider, and particularly from the plane of attachment of the spider to the central rotating rod or tube 20. The usual method of formation has been to blank out a spider which has circumferentially directed tabs extending from the outer ends of the arms thereof. These tabs are then bent to lie flat against the backs of the helical blades, the bend mounting to somewhat less than 90°, and the blades then riveted to the tabs. Other forms that I have seen include tabs bent in opposite directions at each point of attachment between the arm of the spider and the blade and riveted on either side of the plane of the spider body. Still other reels use forged or cast spiders which, of course, are far more expensive than a spider which can be formed of a simple stamping. In other words, it is a characteristic of all stamped spiders of my observation that the point of attachment between the spider arm and the blade lies to one or to both sides of the plane of the spider body, that a portion of the spider arm which has not been bent backs up the blades, and being substantially normal thereto, provides unyielding support at the backing up point, and that the point of riveted attachment is likewise laterally spaced from this supporting rib.

The action of a helical blade in cutting grass amounts substantially to a continuously moving, very small area of cut travelling progressively across the full width of the bed knife. The reel knives are generally relatively thin and therefore somewhat flexible. Thus, as the cut progresses, a torsional strain is applied at a continuously travelling point over the length of the reel knife and the strain is great enough and the blade thin enough so that an appreciable amount of flexure takes place between the points of blade support. In view, then of the point of rigid blade support and the laterally spaced point of riveted attachment, a strong intermittent force is applied to each point of attachment tending to loosen the rivet and eventually destroy the connection.

My invention, while exceedingly simple, wholly avoids this deficiency.

I provide a spider which is blanked out of heavy sheet metal so as to have relatively narrow arms 24. This spider is punched with a large central hole 28 for welded attachment to the central rod 20. The arms 24 are likewise punched near their extremities with rivet holes 30. Thereafter the ends of the arms 24 are twisted through that angle of somewhat less than 90° so as to lie flat against the back of the conventional helical lawn mower blade. The blades are punched to align with the location of the rivet holes 30 of the spiders as the spiders are attached to the central rod 20, and rivets are passed through the spider arms 24 and blades to secure the blades in conventional fashion to the ends of the spider arms.

From the foregoing description and drawing, it will be noted that I have provided a structure which lacks any rigid shoulder backing up the helical blades at any particular point and furthermore that the point of attachment between the arms and the blades lies in the plane of the body of the spider and the plane of attachment of the spider to the central shaft. The point of maximum support for the blade is identical with the location of the riveted attachment. By this means, the torsional flexures and strains on the riveted connections between the blades and spider arms are greatly minimized to an extent well within the strength of the riveted connection.

It will be understood that the foregoing description of an embodiment of my invention is merely illustrative and it is not my intention to be limited thereby except as my invention is set forth in the following claims.

I claim:

1. A spider for a lawn mower reel having straight narrow arms radiating outward from the center thereof, said arms having centrally located holes adjacent the extremities thereof, said arms having a transverse twist therein to the helical angle of a lawn mower blade intermediate their length to maintain said holes in the plane of the central part of said spider, the axis of said twist being radial with respect to the center of the said spider.

2. A reel for a lawn mower comprising a central rotating shaft, a plurality of helical blades adapted to travel in a cylinder concentric with said shaft, a plurality of spiders spaced along said shaft and fixed thereto in planes perpendicular to the axis of said shaft, said spiders having straight narrow radial arms having a twist therein so that their extremities lie flat against the back of said helical blades, the line of said twist being crosswise of said arms, and means securing said blades to said spider arms in the plane of said spiders.

References Cited in the file of this patent

UNITED STATES PATENTS 2,016,987    Cheadle    Oct. 8, 1935

FOREIGN PATENTS 389,183    Great Britain    Mar. 16, 1933